Nov. 26, 1940.  A. C. VELO  2,222,695
DUAL WHEEL DRIVE AND BRAKE MECHANISM
Filed Aug. 22, 1938  3 Sheets-Sheet 1

INVENTOR
Anthony C. Velo
BY Morgan, Finnegan and Durham
ATTORNEYS

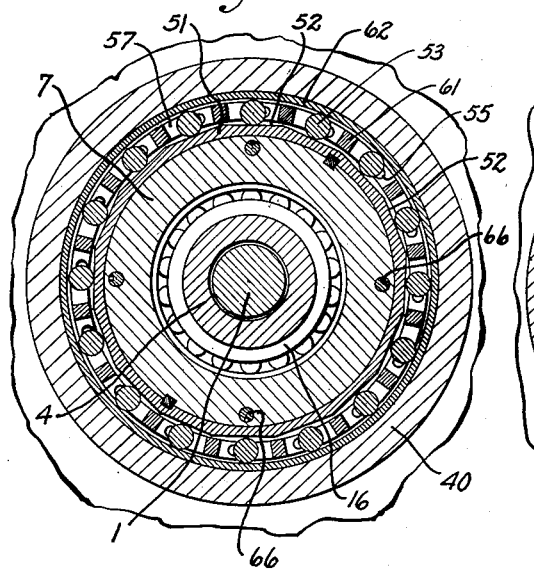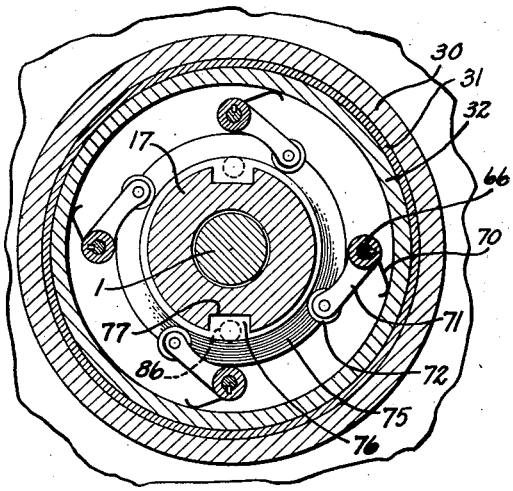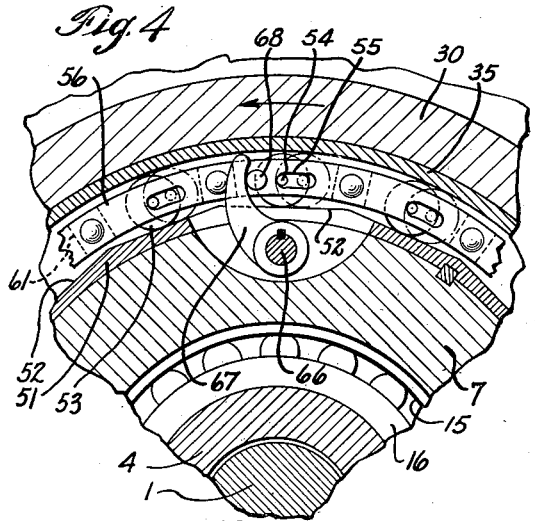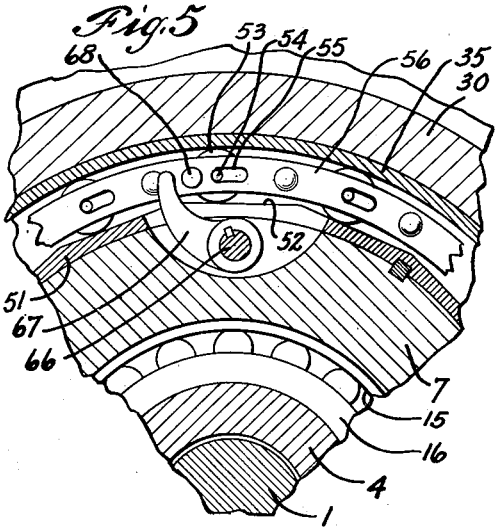

Nov. 26, 1940.  A. C. VELO  2,222,695
DUAL WHEEL DRIVE AND BRAKE MECHANISM
Filed Aug. 22, 1938  3 Sheets-Sheet 3

INVENTOR
Anthony C. Velo
BY
Morgan Finnegan & Durham
ATTORNEYS

Patented Nov. 26, 1940

2,222,695

UNITED STATES PATENT OFFICE 2,222,695

DUAL WHEEL DRIVE AND BRAKE MECHANISM

Anthony C. Velo, Biexedon, N. Y., assignor to Differential Wheel Corporation, a corporation of Delaware Application August 22, 1938, Serial No. 226,077

18 Claims. (Cl. 192—3.5)

The invention relates to new and useful improvements in driving wheel and axle assemblies for automotive vehicles, and more especially to such improvements in such assemblies especially adapted for dual wheel drives.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 2 is a section on line 2—2 of Fig. 1;

Fig. 3 is a section on line 3—3 of Fig. 1;

Fig. 4 is a fragmentary section on line 4—4 of Fig. 1;

Figs. 5 and 6 are similar views, but showing the parts in different operating positions;

Figure 1:
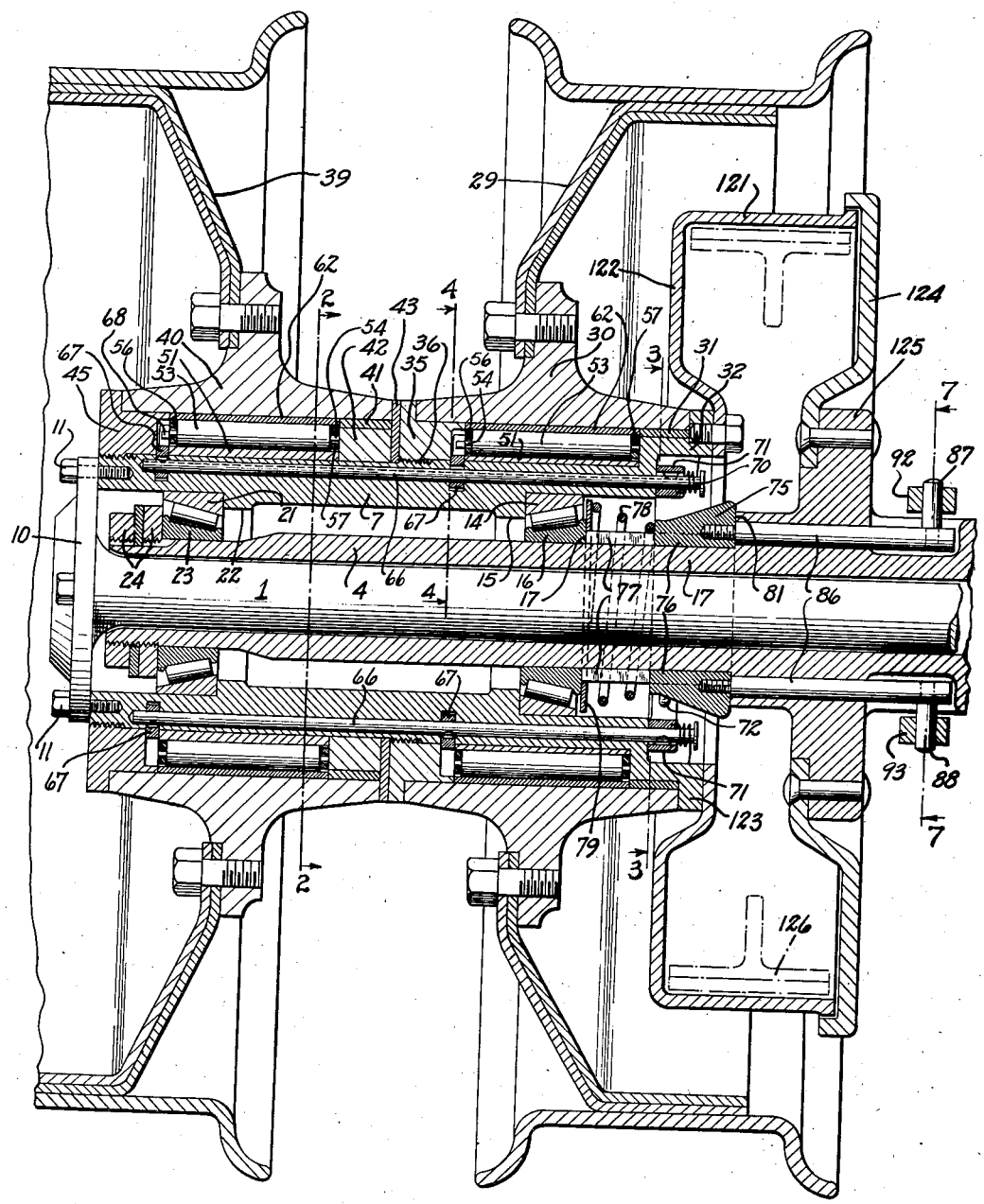
Fig. 1 is a central, axial, fragmentary section through a driven dual wheel and axle assembly embodying the invention.
Figure 7:
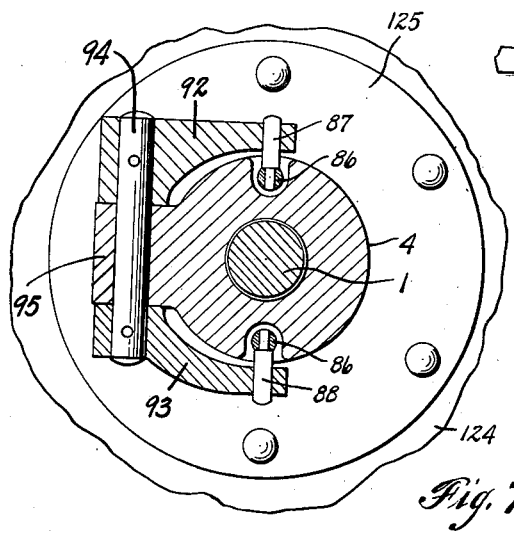
Fig. 7 is a section on line 7—7 of Fig. 1.
Figure 8:
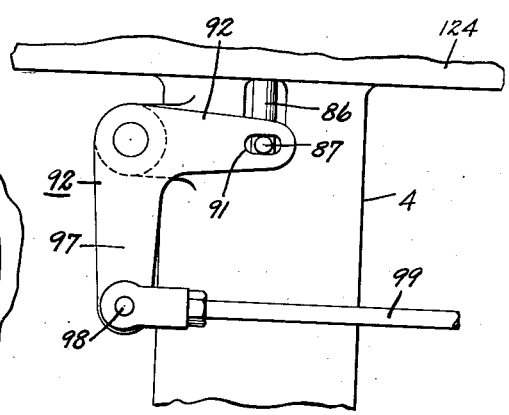
Fig. 8 is a fragmentary detail plan of the right-hand end of Fig. 1.

Objects of the invention are to provide a driving dual wheel and axle assembly for automotive vehicles capacitated to effect correct and efficient coaction and cooperation between the dual wheels, and between the wheels and the drive, under all the varying conditions of road driving; to provide for automatically effecting predetermined desired cooperation between the wheels and the drive from the usual manipulation of the driving controls, namely, the brake and the transmission shift; to provide simple, sturdy and efficient mechanisms for effecting the aforesaid objects; to provide in dual wheel drives for driving the pairs of wheels together from the motor and at the same time permitting necessary free rotational movement, such as overrunning the drive, of one wheel of the pair, as for example of the outside wheel when turning; to permit free wheeling of the wheels when desirable or advantageous; to provide for applying direct and concurrent and uniform braking retardation to both wheels of the pair; to provide such mechanism also capacitated for reversely driving the assembly, and permitting certain free relative rotation of the wheels in said reverse driving, such as in reverse coasting; and to provide under all conditions and requirements of road driving, especially those incident to heavy-duty commercial vehicles, full driving traction from all wheels, full practicable utilization of momentum, distribution and equalization of tractive effort to all wheels, with avoidance of undue wear and strain upon any of the wheels; to provide means automatically brought into actuation by the usual manipulation of the ordinary driving controls, for correspondingly governing the assembly to effect the most efficient action and coaction of the wheels, as for instance on application of the brakes to secure uniform and reliable braking action on both or all wheels, or in putting the transmission lever into reverse to secure the proper wheel coaction for reverse driving.

As preferably embodied in an automotive vehicle having a motor, a transmission mechanism and rake mechanism of any suitable kind, and as here disclosed, a driving axle, of the free floating type, which may be driven from any suitable differential, has at either end of the axle a sleeve fixed to the end of the axle and enclosing the outer end of the axle housing, there being anti-friction roller bearings interposed between the sleeve and the housing. The dual wheels are rotatably mounted on the sleeve on anti-friction bearings, and interposed between each wheel and the sleeve is a two-way roller clutch device, including a plurality of clutch rollers mounted in a floating cylindrical cage enclosing and angularly movable about the sleeve, the limited angular movement of the cage controlling in part the clutching and releasing action between the sleeve and the particular wheel. A brake drum is fixed to the sleeve to rotate therewith. There are connections between the brake-applying lever and the floating cages of the clutch mechanism whereby the cage is positioned, is held from movement, or is permitted to move, for automatically effecting locking of the wheels to the sleeve when the brake is applied, and there are like connections from the gear shift mechanism to govern the position and movement of the cages when the vehicle is driven in reverse. The mechanism is capacitated to drive the vehicle forwardly by four traction wheels, to permit free wheeling of any wheel independently of the others, to permit differential driving of any and all the wheels in turning, to cause the mechanism to function in reverse driving, including coasting in reverse driving, and for locking all the traction wheels to the brake whenever applied, either in forward or reverse driving. It will be understood that the foregoing general description and the following detailed description as well are exemplary and explanatory of the invention but are not restrictive thereof.

Referring now in detail to the embodiment of the invention, illustrated by way of example in the accompanying drawings, there is shown in Fig. 1 the outer end part of an axle 1, which is driven in any suitable manner, as from a differential drive (not shown). As here embodied and shown, the axle is within the non-rotating axle housing 4, which may be connected to the vehicle chassis by means of any suitable spring mounting (not shown). Surrounding the exterior ends of the axle 1 and of the housing 4 is a sleeve 7, which is spaced away from the enclosed housing 4, and is fixed to the outer end of axle 1, so that the exterior sleeve 7 and the enclosed axle 1 are rotatable together with respect to the housing 4. The connecting means between the axle 1 and sleeve 7 comprises a disc-like head 10 formed on the outer end of the axle 1, the flat inner face of the disc abutting against the outer flat end of the sleeve 7, the flange being fastened to the end of the sleeve by screw bolts 11. There are two spaced-apart radial thrust roller bearings between the sleeve 7 and the enclosed axle housing 4. The inner bearing has its outer race ring 14 abutting on its outer face against an annular, inwardly-projecting ring 15 formed on the interior of the sleeve 7. The inner race ring 16 of this bearing abuts on its outer face on an annular shoulder 17 formed exteriorly on the housing 4. The outside roller bearing has its outer race ring 21 abutting on its inner face against an annular, inwardly-projecting ring 22 formed on the inside of the sleeve 7, and the inner race ring 23 of this bearing abuts against a lock nut 24 screw-threaded on the exterior end of the housing 4.

The dual wheels are mounted on the sleeve 7 so as to be driven from the axle 1 so as to secure the varied coactions and functions herein described. The inner wheel 29 has a hub 30 rotatively journalled at its inner part on a loose sleeve 31, which is mounted on an enlarged cylindrical end 32 of the sleeve 7, that end of the sleeve being enlarged for the purpose of housing a part of the control mechanism hereinafter described. The outer part of the hub 30 of wheel 29 is journalled on a bearing collar 35 which is screw-threaded at 36 upon a threaded portion on the exterior of the sleeve 7, and has an outwardly-extending annular flange abutting the end of the hub, thereby maintaining the wheel 29 from lateral displacement. In like manner the exterior wheel 39 has its hub 40 rotatively mounted upon a sleeve 41, which sleeve is rotatively mounted on a collar 42 mounted on the exterior of the sleeve 7, and there is preferably an annular spacing washer 43 interposed between the inner flat faces of the parts just described and the outer flat face of the retaining and bearing sleeve 35 for the wheel 29. The outer part of the hub 40 is rotatively supported upon a bearing collar 45 which is screw-threaded onto the threaded outer end of the sleeve 7 and has an outwardly-extending annular flange on which the outer face of hub 40 abuts.

Connections are provided between the sleeve 7 and the respective wheels 29 and 39 which will provide for forwardly driving the wheels while permitting compensating relative movement between them, free wheeling of both wheels, or either wheel, and other coactions and relative movements as hereinafter described. For this purpose, interposed between the driving sleeve 7 and the respective hubs 30 and 40 of the dual wheels are two independently operating driving connections, each comprising a plurality of two-way roller clutches. These two driving connections may be substantially the same, are mounted side by side on sleeve 7, and a single description is applied to both. Fixedly mounted on the exterior of the sleeve 7 is an annular member 51 of considerable width, its outer face consisting of a series of successive straight flat surfaces 52, constituting a part of the roller clutch mechanism. Running on the surfaces 52 are corresponding rollers 53, these rollers having at either end pintles 54, which pintles extend into elongated slots 55, formed in a pair of flat, annular, spaced-apart, parallel rings 56 and 57. The rings 56 and 57 are connected together into a unitary structure by a series of cross bars 61, located between the rollers 53, and extending across between the inner sides of the two rings and fastened to each ring, so that the rings and the cross bars form a floating frame, or hollow cylindrical cage, about the member 51. The annular movement of this structure, however, is restricted and controlled as hereinafter described. Thus the entire floating frame has limited angular movement, and the various rollers 53 have movement relatively to the floating frame within the limit set by their slots 55. Bearing on the exterior of the rolls 53 is an annular sleeve 62 fixed to the interior of the wheel hub. The controlled movements of the rollers 53 between the cylindrical inner surface of sleeve 62 and the flat outer faces 52 of the ring or sleeve 51 effects the desired clutchings, respectively, of the wheel hubs to the sleeve 7, and the declutchings of the hubs, respectively, from the sleeve.

Means are provided for governing angular movement of the floating cage in which the clutch rollers 53 are mounted, so as to effect clutchings and declutchings as desired, said means being connected to the vehicle controls such as the shift lever and brake lever or pedal. As embodied, a plurality of shafts 66 are rotatively mounted in longitudinally-extending apertures within the sleeve 7, and fixed on these shafts 66 are stop fingers 67, which extend up alongside and exteriorly to the flat rings 56 of the clutch cage. Fixed to the exterior side of the flat rings 56 are stop pins 68, with which arms 67 cooperate. Thus by partially rotating the shafts 66, slight angular movement of the clutch cage may be effected or permitted to effect various desired clutching actions. In the embodied form of means for imparting the desired angular movement to the rods 66, there is fixed to the inner ends of those rods (Figs. 1 and 3), located within the enlarged inner portion 32 of sleeve 7, a plurality of arms 71, there being a cam roller 72 rotatably mounted in the outer end of each of the arms 71. A conoidal actuating cam 75 is mounted upon and encircles the enlarged collared portion 17 of the housing 4, the cam having splines 76 extending into longitudinally disposed grooves 77 formed on the parts 17, whereby the cam 75 may slide along the housing but is held from rotation. Springs 70 hold rollers 72 resiliently to the cam. A helical spring 78 is mounted in compression between the inner flat face of cam 75 and a washer 79, which abuts on the inner face of the race ring 16, thus impelling the cam 75 into retracted position against an annular shoulder 81, formed on the exterior of the housing.

Figure 9:
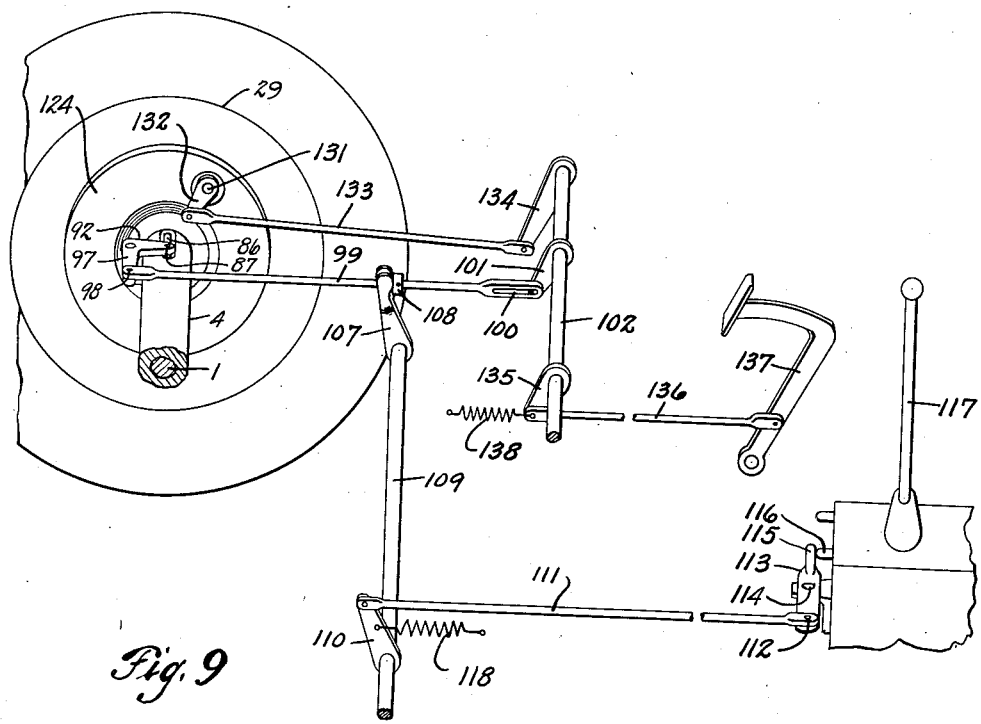
Fig. 9 is a partly diagrammatic perspective of the connections from the wheel driving mechanism to the transmission and braking mechanisms of the vehicle.

The connections from the cam 75 to the transmission mechanism and braking mechanism are exemplarily and somewhat diagrammatically shown in Figs. 1, 3 and 9. Screw-threaded into the inner flat face of the slidable cam 75 are two screw rods 86, which rods lie in longitudinally-disposed recesses formed in the outside of the housing 4. To the outer ends of these rods are fixed two outwardly-extending pins 87 and 88. These pins project into elongated slots 91 formed in a corresponding pair of arms 92, 93, which are fixed upon a shaft 94 rotatively mounted in an outwardly-extending lug 95 formed on the housing 4. The lever 92 has integral therewith an actuating arm 97, which is pivotally connected at 98 to a rod 99, which at its other end has a slotted connection 100 with an arm 101 fixed on the shaft 102 of the brake mechanism. The connection to the transmission, as shown, comprises a yoked arm 107, which straddles the rod 99 and cooperates with a collar 108 fixed on said rod. The arm 107 is fixed on a shaft 109, on which shaft is also fixed an arm 110. Pivotally connected to arm 110 is a thrust rod 111, pivotally connected at 112 to a lever 113. Lever 113 is pivotally mounted at 114 on the transmission case, the other end 115 of the lever abutting on one of the sliding transmission rods 116. These rods are longitudinally slidable under actuation of the shift lever 117 in a well-known manner. A spring 118 resiliently holds lever 107 to collar 108.

The braking means as embodied comprises a brake drum 121, having its flat outer face 122 bolted onto the flat annular flange 123 which constitutes the inner end of the enlarged portion 32 of the rotatable sleeve 7. A suitable closure plate 124 for the inner end of the brake drum is bolted on an annular flanged extension 125 of the axle housing 4. Any suitable form of brake shoes may be employed, as shown diagrammatically at 126, and as shown it is of the mechanically-actuated expansion type. As illustrated, a shaft 131 of the brake-actuating mechanism has fixed thereto an arm 132, to which is pivoted a rod 133, said rod being pivoted at its other end to an arm 134 fixed on the brake shaft 102, previously described. Fixed on brake shaft 102 is an actuating arm 135, to which is pivoted a rod 136, the other end of which is pivoted to a brake-pedal lever 137 and a suitable spring 138 acts to normally hold the brake mechanism in the off position.

Referring now to the manner of operation of the hereinbefore-described mechanism, and considering especially Figs. 4 to 6:

The vehicle may be considered as travelling toward the left under the drive of the motor, with the brake off and with the gear shift in any of the forward speeds. The cam 75 is then in the retracted position of Fig. 1, under the impulsion of the spring 78, and stop arms 67 are in the position of Fig. 4, the pins 68 being against their respective stop arms, and preventing forward movement of the clutch roller cage. The sleeve 7 is being rotated by the motor in counter-clockwise direction in Fig. 4, and the clutch rollers 53 consequently have been moved to the broken line position shown in Fig. 4, and are thus exerting torque on the hubs 30 and 40 of the wheels 29 and 39 in counter-clockwise direction, representing direct forward drive of the motor on both wheels. At any time when the forward momentum of the truck exceeds the motor drive, the hubs will have counter-clockwise movement relatively to sleeve 7, and the rollers 53 will move or roll forwardly in their slots 55 to the free-wheeling position shown in solid lines in Fig. 4, and in this position the rollers 53 rotate freely, and the wheels rotate freely with respect to the sleeve 7. Again, considering the motor as driving, in making a turn, the differential will operate in the usual manner with respect to the inner and outer pairs of wheels, but in each pair of wheels the radially more distant wheel must travel a greater distance than its twin, and by reason of its contact with the road is speeded up relatively to its companion wheel. Because of this the clutch rollers 53 for that wheel will be in the full-line, free-wheeling position of Fig. 4, even though the clutch rollers of the radially inner wheel of the pair is in the driving position shown in broken line in Fig. 4. If, in turning, the motor drive is cut down, all of the wheels may be in free wheeling. In any event tire dragging and wear due to turning is avoided.

In the case of reverse driving, toward the right in Figs. 5 and 6, moving the shift lever 117 into reverse moves gear slide rod 116 so that spring 118, acting on arm 110 pulls rod 99 forward, and through lever 97 and rods 86 moves cam 75 to the left in Fig. 1. Rollers 72 ride up on the conical surface of cam 75, and thereby slightly rock their rods 66, and stop fingers 67 are moved a short distance counter-clockwise from the position shown in Fig. 4 to that shown in Figs. 5 and 6. In reverse driving the sleeve 7 is driven in clockwise direction on Fig. 5, but due to the position of the fingers 67, the clutch roller cage can rotate counter-clockwise sufficiently so that the rollers 53 will clutch at the left-hand full line position shown in Fig. 5, and will drive the wheel in clockwise or reverse direction. In case of coasting in reverse, as shown in Fig. 6, the sleeve 7 is being driven in reverse by the reverse rotation of the heel hub 30 rotating in a clockwise direction, and rollers 53 will be rolled by a movement of the hub to the right hand end of their slots 55 if wheel 30 is travelling faster than wheel 40, and the slower travelling wheel will have a slight counter-clockwise movement with respect to the sleeve 7, thereby holding its rollers 53 in non-clutching position, allowing independent rotation of the wheels as the vehicle coasts rearwardly.

Whenever the brakes are applied, uniform braking action is imposed on all the wheels. When the brake lever 137 is depressed, rod 99 is pulled to the right in Fig. 9, and cam 75 is moved against spring 78, and thereby rocks the rods 56 and stop fingers 67 in the manner already described and to the position shown in Figs. 5 and 6. This applies a retardant braking action to drum 121 and to sleeve 7 and shaft 1, and this retardation effects relative movement of the sleeve 7 in clockwise direction relatively to the hub 40 in Fig. 5. The rollers 53 would be rolled counter-clockwise on their tracks 52, and due to the position of stop fingers 67, the cages are moved counter-clockwise sufficiently so that the rollers 53 lock both the wheels to the sleeve 7, and both wheels receive the full and uniform effect of the braking action. In case the brakes are applied during reverse driving, at which time the parts are in the position of Fig. 5, the retardant relative movement of sleeve 7 would be in the counter-clockwise direction in Fig. 6, and due to the relative rotation of the wheel in the clockwise direction, the rollers 53 roll in the clockwise direction, and the roller cage may also move in that direction, and the sleeve 7 and the hubs are locked together, in the position shown in Fig. 6, thus clutching the sleeve 7 and the wheels together and effecting uniform braking action on both wheels.

The invention in its broader aspects is not limited to the specific mechanisms shown and described but departures may be made therefrom within the scope of the accompanying claims without departing from the principles of the invention and without sacrificing its chief advantages.

What I claim is:

1. In an automotive vehicle, in combination a driving axle, an axle housing, a sleeve about the housing and fixed to the shaft to rotate therewith, dual wheels independently rotatably mounted side by side upon the sleeve, connections between the sleeve and wheels for driving the wheels while permitting free wheeling of one or both wheels, and braking mechanism including a brake drum fixed to the sleeve and means acting on said driving connections to lock both wheels to the sleeve when the brake is applied.

2. In an automotive vehicle, in combination a driving axle, dual wheels concentric with the axle and driven therefrom, and a driving connection from the axle for driving one of said wheels, a driving connection from the axle for driving the other of said wheels, said driving connections including devices permitting free wheeling of a wheel relatively to the axle and independently of the other wheel, and braking mechanism including a brake drum and means acting on said driving connections to lock both wheels to rotate with the axle when the brake is applied.

3. In an automotive vehicle, in combination a driving axle, an axle housing, a sleeve about the housing and fixed to the shaft to rotate therewith, dual wheels independently rotatably mounted side by side upon the sleeve, driving connections between the sleeve and a wheel for driving the wheel with the sleeve and permitting the wheel to overrun the sleeve, and driving connections for the other wheel, independent of said driving connections for said first mentioned wheel for driving said other wheel from the sleeve and permitting said wheel to overrun the sleeve.

4. In an automotive vehicle, in combination a driving axle, an axle housing, a sleeve about the housing and fixed to the shaft to rotate therewith, dual wheels independently rotatably mounted side by side upon the sleeve, driving connections between the sleeve and a wheel for driving the wheel with the sleeve and permitting the wheel to overrun the sleeve and driving connections for the other wheel, independent of said driving connections for said first mentioned wheel for driving said other wheel from the sleeve and permitting said wheel to overrun the sleeve, brake mechanism for braking the sleeve and means controlled by the brake mechanism for fixing both wheels to the sleeve.

5. A dual driving wheel and axle assembly adapted for use in an automotive vehicle including in combination a driving axle, an axle housing, a sleeve about the housing and fixed to the shaft to rotate therewith, dual wheels independently rotatably mounted side by side upon the sleeve, a double acting clutch mechanism between said sleeve and one of said wheels, and a double acting clutch mechanism between said sleeve and the other of said wheels.

6. A dual driving wheel and axle assembly adapted for use in an automotive vehicle including in combination a driving axle, an axle housing, a sleeve about the housing and fixed to the shaft to rotate therewith, dual wheels independently rotatably mounted side by side upon the sleeve, a double acting clutch mechanism between said sleeve and one of said wheels, a double acting clutch mechanism between said sleeve and the other of said wheels, and means controlled by the brake mechanism for fixing both wheels to the sleeve.

7. A dual driving wheel and axle assembly adapted for use in an automotive vehicle including in combination a driving axle, an axle housing, a sleeve about the housing and fixed to the shaft to rotate therewith, dual wheels independently rotatably mounted side by side upon the sleeve, connections between the sleeve and wheels for driving the wheels while permitting free wheeling of one or both wheels, a motor and transmission mechanism and connections from the transmission gear shift for causing said driving connections to drive said wheels in reverse direction.

8. A dual driving wheel and axle assembly adapted for use in an automotive vehicle including in combination a driving axle, an axle housing, a sleeve about the housing and fixed to the shaft to rotate therewith, dual wheels independently rotatably mounted side by side upon the sleeve, and wheel driving means comprising connections between said sleeve and each wheel whereby said sleeve may drive each wheel directly and each wheel may have rotative movement independently of the rotation of the sleeve and the other wheel.

9. A dual driving wheel and axle assembly adapted for use in an automotive vehicle including in combination a driving axle, an axle housing, a sleeve about the housing and fixed to the shaft to rotate therewith, dual wheels independently rotatably mounted side by side upon the sleeve, wheel driving means comprising connections between said sleeve and each wheel whereby said sleeve may drive each wheel directly and each wheel may have rotative movement independently of the rotation of the sleeve and the other wheel, and means for fixing both wheels to the sleeve.

10. In an automotive vehicle, in combination a driving axle, dual wheels concentric with the axle and driven therefrom, and a driving connection from the axle for driving one of said wheels including a two-way clutch, a driving connection from the axle for driving the other of said wheels including a two-way clutch, said driving connections including devices permitting free wheeling of a wheel relatively to the axle and independently of the other wheel, and a connection from the gear shift mechanism for governing said driving connections.

11. In an automotive vehicle, in combination a driving axle, dual wheels concentric with the axle and driven therefrom, and a driving connection from the axle for driving one of said wheels, a driving connection from the axle for driving the other of said wheels, said driving connections including devices permitting free wheeling of a wheel relatively to the axle and independently of the other wheel, braking mechanism including a brake drum and means acting on said driving connections to lock both wheels to rotate with the axle when the brake is applied, and a connection from the gear shift mechanism for governing said driving connections.

12. In an automotive vehicle having a motor, a transmission and a brake mechanism, a dual driving wheel and axle assembly, including in combination a driving axle, an axle housing, a sleeve about the housing and fixed to the shaft to rotate therewith, dual wheels independently rotatably mounted side by side upon the sleeve, a double-acting roller clutch mechanism between said driven sleeve and one of said wheels, a double acting roller clutch mechanism between said driven axle and the other of said wheels, a governing mechanism for said clutch mechanisms, said governing mechanism acting to normally drive both wheels independently from said sleeve, while permitting free wheeling of either wheel, said brake mechanism including a drum fixed to said sleeve, means acting automatically on said governing mechanism when the brake is applied to lock both wheels to said sleeve, and connections from the transmission gear shift for causing said governing means to position said clutches for independent reverse driving of said wheels and to cause said automatic locking of the wheels to the sleeve by the braking mechanism to take place in reverse driving.

13. In an automotive vehicle having a motor, a transmission and a brake mechanism, a dual driving wheel and axle assembly, including in combination a driving axle, an axle housing, a sleeve about the housing and fixed to the shaft to rotate therewith, dual wheels independently rotatably mounted side by side upon the sleeve, a double-acting roller clutch mechanism between said driven sleeve and one of said wheels, a double acting roller clutch mechanism between said driven axle and the other of said wheels, a governing mechanism for said clutch mechanisms, said governing mechanism acting to normally drive both wheels independently from said sleeve, while permitting free wheeling of either wheel, said brake mechanism including a drum fixed to said sleeve, means acting automatically on said governing mechanism when the brake is applied to lock both wheels to said sleeve, and a motor and transmission mechanism, and connections from the transmission gear shift for causing said governing means to position said clutches for independent reverse driving of said wheels.

14. In an automotive vehicle having a motor, a transmission and a brake mechanism, a dual driving wheel and axle assembly, including in combination a driving axle, an axle housing, a sleeve about the housing and fixed to the shaft to rotate therewith, dual wheels independently rotatably mounted side by side upon the sleeve, a double-acting roller clutch mechanism between said driven sleeve and one of said wheels, a double acting roller clutch mechanism between said driven axle and the other of said wheels, a governing mechanism for said clutch mechanisms, said governing mechanism acting to normally drive both wheels independently from said sleeve, while permitting free wheeling of either wheel, a brake mechanism including a drum fixed to said sleeve, and means acting automatically on said governing mechanism when the brake is applied to lock both wheels to said sleeve when the vehicle is travelling forward and in reverse.

15. In an automotive vehicle, a driving axle, dual wheels independently rotatably mounted side by side concentric with the axle, a double-acting roller clutch mechanism between said axle and one of said wheels, a double acting roller clutch mechanism between said axle and the other of said wheels, a governing mechanism for said clutch mechanisms, said governing mechanism acting to normally drive both wheels independently from said axle, while permitting free wheeling of either wheel, a brake mechanism including a drum fixed relatively to said axle, means acting automatically on said governing mechanism when the brake is applied to lock both wheels to said axle, a motor and transmission mechanism, and connections from the transmission gear shift for causing said governing means to position said clutches for independent reverse driving of said wheels and to cause said automatic locking of the wheels to the sleeve by the braking mechanism to take place in reverse driving.

16. In an automotive vehicle, a driving axle, dual wheels independently rotatably mounted side by side concentric with the axle, a double-acting roller clutch mechanism between said axle and one of said wheels, a double acting roller clutch mechanism between said axle and the other of said wheels, a governing mechanism for said clutch mechanisms, said governing mechanism acting to normally drive both wheels independently from said axle, while permitting free wheeling of either wheel, a brake mechanism including a drum fixed to said sleeve, and means acting automatically on said governing mechanism when the brake is applied to lock both wheels relatively to the axle.

17. In an automotive vehicle, in combination a driving axle, dual wheels concentric with the axle and driven therefrom, a driving connection between the shaft and a wheel comprising a two way roller clutch having a plurality of rollers, a floating annular cage in which the rollers are mounted, and means for permitting and preventing angular movement of said cage.

18. In an automotive vehicle, in combination a driving axle, dual wheels concentric with the axle and driven therefrom, a driving connection between the shaft and a wheel comprising a two way roller clutch having a plurality of rollers, a floating annular cage in which the rollers are mounted, means for permitting and preventing angular movement of said cage, and connections from the vehicle brake mechanism to said means for governing the clutch cage.

ANTHONY C. VELO.